US012587943B2

(12) United States Patent (10) Patent No.: US 12,587,943 B2
Ma et al. (45) Date of Patent: Mar. 24, 2026

(54) SIGNAL TRANSMISSION METHOD AND APPARATUS, ACCESS NODE, PROCESSING UNIT, SYSTEM AND MEDIUM

(71) Applicant: ZTE Corporation, Shenzhen (CN)

(72) Inventors: Yihua Ma, Shenzhen (CN); Yijian Chen, Shenzhen (CN); Zhifeng Yuan, Shenzhen (CN); Guanghui Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 417 days.

(21) Appl. No.: 18/026,872

(22) PCT Filed: Sep. 14, 2021

(86) PCT No.: PCT/CN2021/118097
§ 371 (c)(1),
(2) Date: Mar. 17, 2023

(87) PCT Pub. No.: WO2022/057777
PCT Pub. Date: Mar. 24, 2022

(65) Prior Publication Data
US 2023/0337107 A1 Oct. 19, 2023

(30) Foreign Application Priority Data

Sep. 17, 2020 (CN) ......................... 202010982325.X

(51) Int. Cl.
*H04W 40/16* (2009.01)
*H04L 25/02* (2006.01)
(52) U.S. Cl.
CPC ......... *H04W 40/16* (2013.01); *H04L 25/0228* (2013.01)

(58) Field of Classification Search
CPC ... H04W 40/16; H04W 84/12; H04W 74/002; H04W 8/08; H04W 28/0236;
(Continued)

(56) References Cited

U.S. PATENT DOCUMENTS

2010/0296405 A1* 11/2010 Madan ................ H04W 72/541
370/252
2014/0286269 A1 9/2014 Stanwood et al.
(Continued)

FOREIGN PATENT DOCUMENTS

CN 102404090 A 4/2012
CN 104393964 A * 3/2015 ........... H04B 7/0456
(Continued)

OTHER PUBLICATIONS

Indian Office Action for corresponding application 202327027223, Report dated Aug. 24, 2023.
(Continued)

*Primary Examiner* — Atique Ahmed
(74) *Attorney, Agent, or Firm* — CANTOR COLBURN LLP

(57) ABSTRACT

Provided are a signal transmission method and apparatus, an access point, a processing unit, a system, and a medium. The signal transmission method includes, according to the channel estimation of a current AP, determining a multi-user uplink data signal and a first inter-user interference information matrix which correspond to the current AP; and transmitting the multi-user uplink data signal and the first inter-user interference information matrix to the next-stage node of the current AP in a front-haul link.

18 Claims, 4 Drawing Sheets

Receive a multi-user uplink data signal and a first inter-user interference information matrix which are transmitted by the last-stage AP in a front-haul link ⟩210

Determine a signal for demodulation according to the multi-user uplink data signal and the first inter-user interference information matrix ⟩220

(58) Field of Classification Search

CPC ... H04W 48/16; H04W 72/541; H04W 24/02; H04W 24/08; H04W 88/02; H04W 88/08; H04W 84/045; H04W 52/242; H04L 25/0228; H04L 25/0204; H04L 5/14; H04L 5/0071; H04B 7/024; H04B 7/0452; H04B 17/345; H04B 17/336

See application file for complete search history.

(56)                References Cited

U.S. PATENT DOCUMENTS

| 2015/0156794 A1* | 6/2015 | Kwon ................. H04L 25/0224 370/329 |
| 2015/0381244 A1* | 12/2015 | Byun .................... H04B 7/065 375/267 |
| 2017/0063437 A1* | 3/2017 | Elsherif ............... H04B 7/0452 |
| 2017/0359108 A1 | 12/2017 | Abdel Khalek et al. |
| 2019/0045460 A1* | 2/2019 | Muruganathan .... H04W 52/367 |
| 2019/0190569 A1* | 6/2019 | Nayeb Nazar ....... H04B 7/0639 |
| 2020/0119772 A1 | 4/2020 | Interdonato |
| 2022/0217018 A1* | 7/2022 | Huang ................. H04B 17/309 |
| 2023/0032986 A1* | 2/2023 | Nayeb Nazar ....... H04B 7/0639 |
| 2024/0380447 A1* | 11/2024 | Forenza ................ H04B 17/12 |

FOREIGN PATENT DOCUMENTS

| CN | 107078880 A | * | 8/2017 | .......... H04L 5/0023 |
| CN | 107094124 A | | 8/2017 | |
| CN | 110224729 A | | 9/2019 | |
| CN | 112135288 A | | 12/2020 | |
| WO | 2020130902 A1 | | 6/2020 | |

OTHER PUBLICATIONS

Chinese Office Action for corresponding application 202010982325X; Report dated Aug. 17, 2024.

Chinese Search Report for corresponding application 202010982325X; Report dated Sep. 17, 2020.

European Search Report for corresponding application EP21868600; Report dated Sep. 10, 2024.

Giovanni Interdonato, Ubiquitous cell-free Massive MIMO Communcations, Apr. 10, 2018, XP081491047.

International Search Report for corresponding application PCT/CN2021/118097 filed Sep. 14, 2021; Mail date Dec. 15, 2021.

Zakir Hussain Shaik, et al., "Cell-Free Massive MIMO with Radio Strioes and Sequential Uplink Processing", Mar. 5, 2020.

* cited by examiner

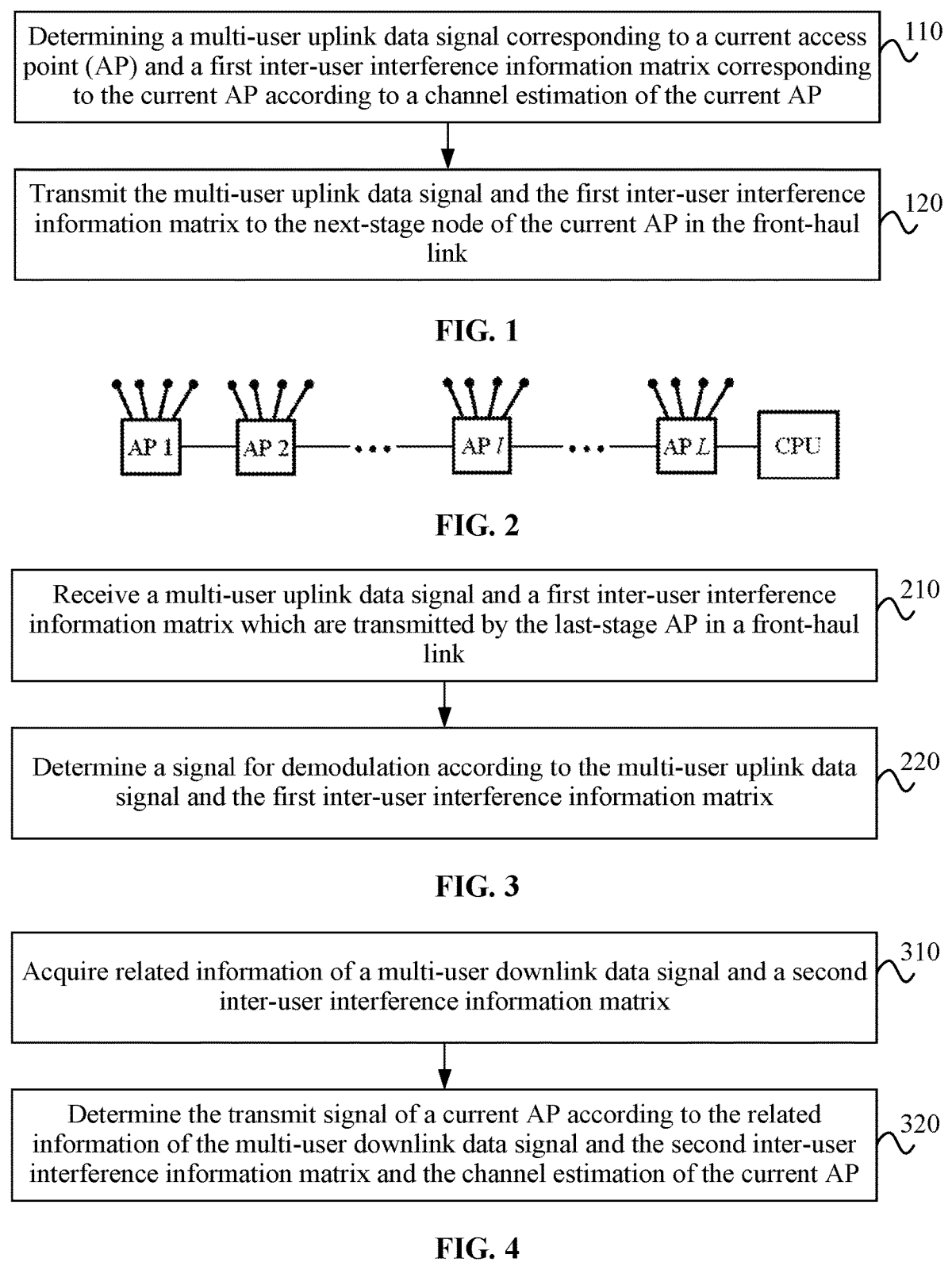

Determining a multi-user uplink data signal corresponding to a current access point (AP) and a first inter-user interference information matrix corresponding to the current AP according to a channel estimation of the current AP — 110

Transmit the multi-user uplink data signal and the first inter-user interference information matrix to the next-stage node of the current AP in the front-haul link — 120

FIG. 1

AP 1 — AP 2 — • • • — AP *l* — • • • — AP *L* — CPU

FIG. 2

Receive a multi-user uplink data signal and a first inter-user interference information matrix which are transmitted by the last-stage AP in a front-haul link — 210

Determine a signal for demodulation according to the multi-user uplink data signal and the first inter-user interference information matrix — 220

FIG. 3

Acquire related information of a multi-user downlink data signal and a second inter-user interference information matrix — 310

Determine the transmit signal of a current AP according to the related information of the multi-user downlink data signal and the second inter-user interference information matrix and the channel estimation of the current AP — 320

FIG. 4

Send a multi-user downlink data signal or the product signal of a multi-user downlink data signal and a second inter-user interference information matrix to an AP of each stage in a front-haul link $\sim$410
FIG. 5
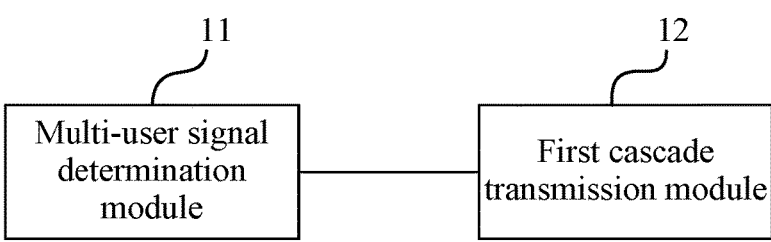
FIG. 6
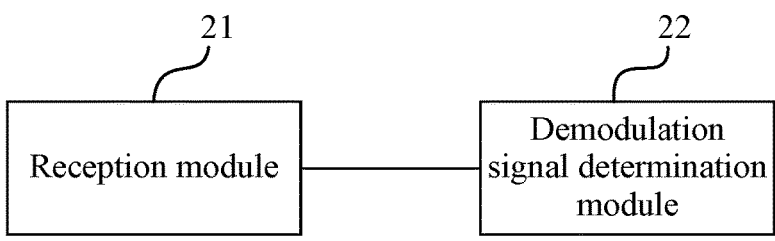
FIG. 7
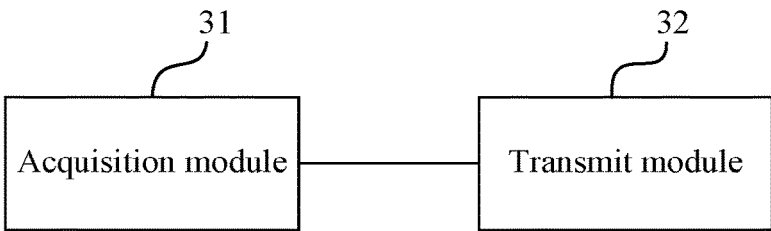
FIG. 8
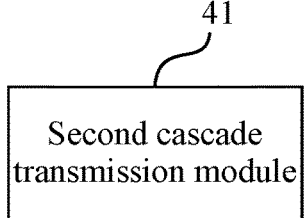
FIG. 9

SIGNAL TRANSMISSION METHOD AND APPARATUS, ACCESS NODE, PROCESSING UNIT, SYSTEM AND MEDIUM

CROSS-REFERENCE TO RELATED APPLICATIONS

This is a National Stage Application filed under 35 U.S.C. 371 based on International Patent Application No. PCT/CN2021/118097, filed on Sep. 14, 2021, which claims priority to Chinese Patent Application No. 202010982325.X filed on Sep. 17, 2020, the disclosures of both of which are incorporated herein by reference in their entireties.

TECHNICAL FIELD

The present application relates to the field of radio communication networks, for example, a signal transmission method and apparatus, an access point, a processing unit, a system, and a medium.

BACKGROUND

Radio stripe is an efficient and low-cost cell-free implementation manner. A multi-stage wireless access point (AP) is connected to a central processing unit (CPU) by a front-haul link. For an uplink data signal sent by a terminal and a downlink data signal sent by the CPU, in the traditional method, maximal-ratio combining or sequential processing is performed in each AP. Thus, the load on the front-haul link can be reduced to a certain extent. However, the signal-to-noise ratio of the finally recovered signal on the CPU is low, affecting the signal transmission rate.

SUMMARY

The present application provides a signal transmission method and apparatus, an access point, a processing unit, a system, and a medium to improve the signal-to-noise ratio of a received signal through transmitting a multi-user uplink data signal and a first inter-user interference information matrix.

An embodiment of the present application provides a signal transmission method. The method includes, according to the channel estimation of a current AP, determining a multi-user uplink data signal and a first inter-user interference information matrix which correspond to the current AP; and transmitting the multi-user uplink data signal and the first inter-user interference information matrix to the next stage node of the current AP in a front-haul link.

An embodiment of the present application also provides a signal transmission method. The method includes receiving a multi-user uplink data signal and a first inter-user interference information matrix which are transmitted by the last-stage AP in a front-haul link and determining a signal for demodulation according to the multi-user uplink data signal and the first inter-user interference information matrix.

An embodiment of the present application also provides a signal transmission method. The method includes acquiring related information of a multi-user downlink data signal and a second inter-user interference information matrix and determining a transmit signal of a current AP according to the related information of the multi-user downlink data signal and the second inter-user interference information matrix and the channel estimation of the current AP.

An embodiment of the present application also provides a signal transmission method. The method includes sending a multi-user downlink data signal or a product signal of a multi-user downlink data signal and a second inter-user interference information matrix to an AP of each stage in a front-haul link.

An embodiment of the present application also provides a signal transmission apparatus. The apparatus includes a multi-user signal determination module and a first cascade transmission module.

The multi-user signal determination module is configured to, according to the channel estimation of a current AP, determine a multi-user uplink data signal and a first inter-user interference information matrix which correspond to the current AP. The first cascade transmission module is configured to transmit the multi-user uplink data signal and the first inter-user interference information matrix to a next-stage node of the current AP in a front-haul link.

An embodiment of the present application also provides a signal transmission apparatus. The apparatus includes a reception module and a demodulation signal determination module.

The reception module is configured to receive a multi-user uplink data signal and a first inter-user interference information matrix which are transmitted by the last-stage AP in a front-haul link. The demodulation signal determination module is configured to determine a signal for demodulation according to the multi-user uplink data signal and the first inter-user interference information matrix.

An embodiment of the present application also provides a signal transmission apparatus. The apparatus includes an acquisition module and a transmit module.

The acquisition module is configured to acquire related information of a multi-user downlink data signal and a second inter-user interference information matrix. The transmit module is configured to determine a transmit signal of a current AP according to the related information of the multi-user downlink data signal and the second inter-user interference information matrix and the channel estimation of the current AP.

An embodiment of the present application also provides a signal transmission apparatus. The apparatus includes a second cascade transmission module.

The second cascade transmission module is configured to send a multi-user downlink data signal or a product signal of a multi-user downlink data signal and a second inter-user interference information matrix to an AP of each stage in a front-haul link.

An embodiment of the present application also provides an access point. The access point includes one or more processors and a storage apparatus.

The storage apparatus is configured to store one or more programs. When executed by the one or more processors, the one or more programs cause the one or more processors to implement the preceding signal transmission method applied to the access point.

An embodiment of the present application also provides a CPU. The CPU includes one or more processors and a storage apparatus.

The storage apparatus is configured to store one or more programs. When executed by the one or more processors, the one or more programs cause the one or more processors to implement the preceding signal transmission method applied to the CPU.

An embodiment of the present application also provides a signal transmission system. The system includes the preceding CPU, the preceding access point of at least one stage, and at least two terminals. The CPU transmits signals with each terminal through an AP of at least one stage.

An embodiment of the present application also provides a non-transitory computer-readable storage medium storing a computer program which, when executed by a processor, implements the preceding signal transmission method.

BRIEF DESCRIPTION OF DRAWINGS

FIG. 1 is a flowchart of a signal transmission method according to an embodiment.

FIG. 2 is a diagram illustrating the connection between an access point and a CPU according to an embodiment.

FIG. 3 is a flowchart of another signal transmission method according to an embodiment.

FIG. 4 is a flowchart of another signal transmission method according to an embodiment.

FIG. 5 is a flowchart of another signal transmission method according to an embodiment.

FIG. 6 is a diagram illustrating the structure of a signal transmission apparatus according to an embodiment.

FIG. 7 is a diagram illustrating the structure of another signal transmission apparatus according to an embodiment.

FIG. 8 is a diagram illustrating the structure of another signal transmission apparatus according to an embodiment.

FIG. 9 is a diagram illustrating the structure of another signal transmission apparatus according to an embodiment.

DETAILED DESCRIPTION

Figure 10:
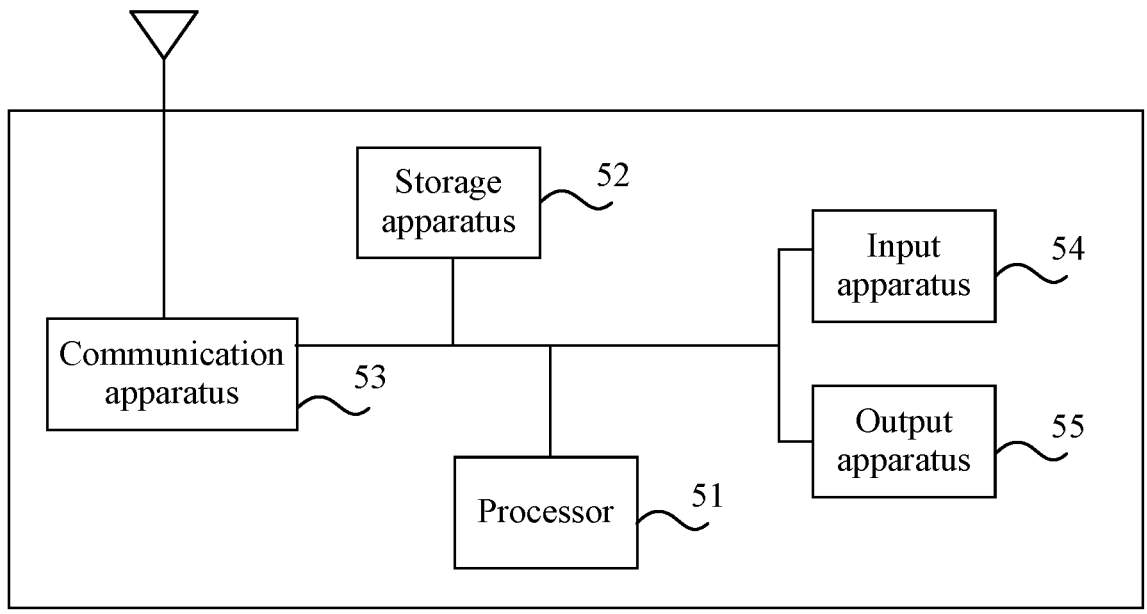
FIG. 10 is a diagram illustrating the structure of hardware of an access point according to an embodiment.

The present application is described hereinafter in conjunction with drawings and embodiments.

The embodiments described herein are intended to explain the present application. For ease of description, only a part, not all, related to the present application are illustrated in the drawings.

In embodiments of the present application, a signal transmission method is provided and applied by an AP of each stage in a front-haul link. In the case where multiple terminals send uplink data signals to a CPU through an AP of at least one stage, the AP of each stage processes the received data signal of each terminal to reduce the load of the front-haul link, thereby ensuring signal transmission efficiency. The data signal sent by each terminal is also collectively referred to as a multi-user uplink data signal. In addition, through transmitting the multi-user uplink data signal and a first inter-user interference information matrix, more information is provided for signal processing of the CPU, thereby improving signal-to-noise ratio of a received signal of the CPU.

FIG. 1 is a flowchart of a signal transmission method according to an embodiment. As shown in FIG. 1, the method provided in this embodiment includes operation 110 and operation 120.

In operation 110, according to the channel estimation of a current AP, a multi-user uplink data signal and a first inter-user interference information matrix which correspond to the current AP are determined.

In a signal transmission system, a CPU provides centralized processing for an AP of at least one stage. A terminal mainly refers to a user equipment (UE). Signals are transmitted between multiple UEs and a CPU through the AP of at least one stage. FIG. 2 is a diagram illustrating the connection between an access point and a CPU according to an embodiment. As shown in FIG. 2, the connection between multiple APs and a CPU constitutes a front-haul link. Each AP is a stage in the front-haul link.

In this embodiment, for a AP (that is, a current AP) in the front-haul link, a multi-user uplink data signal includes uplink data signals sent by multiple terminals to the CPU through the current AP. Each uplink data signal contains uplink data transmitted by a corresponding terminal. In addition, if there is an upper-stage AP of the current AP in the front-haul link, the multi-user uplink data signal also includes a multi-user uplink data signal corresponding to the upper-stage AP transmitted from the upper-stage AP to the current AP. That is, the multi-user uplink data signal of the current AP is a result of combining the multi-user uplink data signal determined according to a channel estimation with the multi-user uplink data signal corresponding to the upper-stage AP. The multi-user uplink data signal is not only received by an AP of each stage, but also transmitted to the CPU through the AP of each stage in turn.

For the current AP, a first inter-user interference information matrix is used for indicating interference between an uplink data signal sent by each terminal and uplink data signals sent by other terminals. In addition, if there is an upper-stage AP of the current AP in the front-haul link, the first inter-user interference information matrix is also affected by the first inter-user interference information matrix corresponding to the upper-stage AP transmitted from the upper-stage AP to the current AP. That is, the first inter-user interference information matrix of the current AP is a result of combining the first inter-user interference information matrix determined according to the channel estimation and the first inter-user interference information matrix corresponding to the upper-stage AP. The first inter-user interference information matrix is not only determined by an AP of each stage according to the channel estimation, but also transmitted to the CPU through the AP of each stage in turn.

In operation 120, the multi-user uplink data signal and the first inter-user interference information matrix are transmitted to the next-stage node of the current AP in the front-haul link.

In this embodiment, after receiving uplink data signals of multiple terminals, an AP of each stage first estimates own channels according to received pilot signals. The obtained channel estimation is denoted as $\hat{H}_i$=1, 2, . . . , 1, . . . L, and L is the total number or total stage number of APs). According to the channel estimation, combined with the received data signals, the multi-user uplink data signal and the first inter-user interference information matrix which need to be transmitted to the next-stage node are determined. If the current AP is the last-stage AP in the front-haul link, that is, the AP directly connected to the CPU. The next-stage node of the current AP refers to the CPU. If the current AP is not the last-stage AP in the front-haul link, the next-stage node of the current AP refers to a next-stage AP.

In this embodiment, on the basis of processing the received data signals to reduce the load of the front-haul link, an AP of each stage in the front-haul link transmits the multi-user uplink data signal and the first inter-user interference information matrix, and the CPU performs further signal processing to recover a more accurate signal.

In an embodiment, an AP of each stage in the front-haul link is provided with at least one antenna. The number of row vectors of the first inter-user interference information matrix and the number of column vectors of the first inter-user interference information matrix are equal, and both are equal to the number of users. The number of row vectors of the multi-user uplink data signal is equal to the number of users. The number of column vectors of the multi-user uplink data signal is equal to the number of data symbols of received signals on a single antenna of the current AP.

In this embodiment, the first inter-user interference information matrix is a matrix with a dimension of K×K. K is the number of users, that is, the number of terminals. The multi-user uplink data signal is a matrix with a dimension of K×D. K is the number of users, that is, the number of terminals. D is the number of data symbols contained in received signals on a single antenna of the current AP, that is, the number of data symbols contained in data signals transmitted by a single user.

In an embodiment, operation 101 is also included.

The channel estimation is determined according to the pilot portion of a received signal. Alternatively, the channel estimation is determined according to the pilot portion of a received signal and correlation matrix prior information of a multi-user channel. Alternatively, the channel estimation is determined according to the pilot portion of a received signal and energy prior information of a multi-user channel.

In this embodiment, an AP of each stage may perform channel estimation according to the pilot portion of a received signal. If there is prior information (including at least one piece of correlation matrix prior information of a channel or energy prior information of a channel), channel estimation is performed according to the pilot portion of the received signal and the prior information.

In an embodiment, the operation 110 includes the following operations.

In the case where the current AP is a first-stage AP, the multi-user uplink data signal corresponding to the current AP is obtained according to a conjugate matrix of the channel estimation of the current AP. In the case where the current AP is not a first-stage AP, a current multi-user uplink data signal is obtained according to the conjugate matrix of the channel estimation of the current AP. The current multi-user uplink data signal is superimposed with a multi-user uplink data signal output from the upper-stage AP of the current AP to obtain the multi-user uplink data signal corresponding to the current AP.

In this embodiment, if the current AP is the first-stage AP in the front-haul link, the corresponding multi-user uplink data signal can be determined according to the conjugate matrix of the channel estimation of the current AP. If the current AP is not the first-stage AP, the current multi-user uplink data signal needs to be determined according to the conjugate matrix of the channel estimation of the current AP. The current multi-user uplink data signal is superimposed with the multi-user uplink data signal transmitted by the upper-stage AP.

In an embodiment, the operation 110 includes the following operations.

In the case where the current AP is a first-stage AP, the first inter-user interference information matrix corresponding to the current AP is obtained according to the channel estimation of the current AP. In the case where the current AP is not a first-stage AP, a current first inter-user interference information matrix is obtained according to the channel estimation of the current AP. The current first inter-user interference information matrix is superimposed with a first inter-user interference information matrix output from the upper-stage AP of the current AP to obtain the first inter-user interference information matrix corresponding to the current AP.

In this embodiment, if the current AP is the first-stage AP in the front-haul link, the corresponding first inter-user interference information matrix can be determined according to the conjugate matrix of the channel estimation of the current AP. If the current AP is not the first-stage AP, the current first inter-user interference information matrix needs to be determined according to the conjugate matrix of the channel estimation of the current AP. The current first inter-user interference information matrix is superimposed with the first inter-user interference information matrix transmitted by the upper-stage AP.

In an embodiment, the first inter-user interference information matrix includes one of the following: a correlation matrix of a multi-user channel; the sum of a correlation matrix of a multi-user channel and a noise diagonal matrix; or the inverse matrix of the sum of a correlation matrix of a multi-user channel and a noise diagonal matrix.

In the process of signal transmission, if an AP of each stage transmits the received data signal to the CPU, a large front-haul overhead is caused. In this embodiment, the AP of each stage can reduce the load and overhead of the front-haul link through transmitting the multi-user uplink data signal and the first inter-user interference information matrix, that is, transmitting the recovered signal to the CPU. Moreover, by superimposing the multi-user uplink data signal of the AP of each stage and the first inter-user interference information matrix of the AP of each stage with the multi-user uplink data signal of the upper-stage AP and the first inter-user interference information matrix of the upper-stage AP respectively, and then transmitting the superimposed result to the next-stage node, the signal-to-noise ratio of a received signal of the CPU can be improved.

The process of signal transmission is described by examples below. In the following examples, the number of users is denoted as K. The multi-user uplink data signal corresponding to the current AP is denoted as $X_l$. The first inter-user interference information matrix corresponding to the current AP is denoted as $R_l$. l denotes the stage number of the current AP. $l \geq 1$, and $l \leq L$. L denotes the total number or the total stage number of the AP. The received signal of the current AP is denoted as $Y_l$. $\sigma^2$ denotes the noise of the received signal. $I_K$ denotes the identity matrix of K×K. $X_{est}$ denotes the signal for demodulation finally determined by the CPU.

In the case where the current AP contains multiple antennas, the channel estimation of the current AP is denoted as $\hat{H}_l$. The conjugate matrix of the channel estimation of the current AP is denoted as $\hat{H}_l^H$. In the case where the current AP contains one antenna, the channel estimation of the current AP is denoted as $\hat{h}_l$. The conjugate matrix of the channel estimation of the current AP is denoted as $\hat{h}_l^H$.

Example One

For the first-stage AP, $\hat{H}_1$ is obtained by estimating the channel according to the pilot portion of $Y_1$. $X_1 = \hat{H}_1^H \cdot Y_1$ and $R_1 = \hat{H}_1^H \cdot \hat{H}_1 + \sigma^2 I_K$ are determined according to $\hat{H}_1$. $R_1$ denotes an Hermite matrix with a dimension of K×K. The first-stage AP transmits $X_1$ and $R_1$ to the second-stage AP. For the l-th stage AP, $1 < l \leq L$. $\hat{H}_l$ is obtained by estimating the channel according to the pilot portion of $Y_l$. $X_l = X_{l-1} + \hat{H}_l^H \cdot Y_l$ and $R_l = R_{l-1} + \hat{H}_l^H \cdot \hat{H}_l$ are determined according to $\hat{H}_l$. $R_l$ is an Hermite matrix with a dimension of K×K. In the case of $l < L$, the l-th stage AP transmits $X_l$ and $R_l$ to the (l+1)-th stage AP. In the case of l=L, the L-th stage AP transmits $X_L$ and $R_L$ to the CPU.

The CPU determines the signal $X_{est}=R_L^{-1}X_L$ for demodulation according to $X_L$ and $R_L$ which are transmitted by the L-th stage AP.

In this example, an AP of each stage contains multiple antennas. The first inter-user interference information matrix is the sum of a correlation matrix of a multi-user channel and a noise diagonal matrix. For the l-th stage AP, $\hat{H}_l$ is first determined according to the pilot portion of a received signal. On this basis, the process of calculating $\hat{H}_l^{H}\cdot Y_l$ and $\hat{H}_l^{H}\cdot H_l$ may be performed in parallel, thereby reducing the processing delay in the process of signal transmission.

Example Two

For the first-stage AP, $\hat{H}_1$ is obtained by estimating the channel according to the pilot portion of $Y_1$. $X_1=\hat{H}^{H}\cdot Y_1$ and $R_1=\hat{H}_1^{H}\cdot\hat{H}_1$ are determined according to $\hat{H}_1$. $R_1$ denotes an Hermite matrix with a dimension of K×K The first-stage AP transmits $X_1$ and $R_1$ to the second-stage AP. For the l-th stage AP, l<l≤L. $\hat{H}_l$ is obtained by estimating the channel according to the pilot portion of $Y_l$. $X_l=X_{l-1}+\hat{H}_l^{H}\cdot Y_l$ and $R_l=R_{l-1}+\hat{H}_1^{H}\cdot\hat{H}_l$ are determined according to $\hat{H}_l$. $R_l$ is an Hermite matrix with a dimension of K×K. In the case of l<L, the l-th stage AP transmits $X_l$ and $R_l$ to the (l+1)-th stage AP. In the case of l=L, the L-th stage AP transmits $X_L$ and $R_L$ to the CPU.

The CPU determines the signal $X_{est}=(R_L+\sigma^2 I_K)^{-1}X_L$ for demodulation according to $X_L$ and $R_L$ which are transmitted by the L-th stage AP.

In this example, an AP of each stage contains multiple antennas. The first inter-user interference information matrix is a correlation matrix of a multi-user channel. For the l-th stage AP, $\hat{H}_l$ is first determined according to the pilot portion of a received signal. On this basis, the process of calculating $\hat{H}_l^{H}\cdot Y_l$ and $\hat{H}_l^{H}\cdot H_l$ may be performed in parallel, thereby reducing the processing delay in the process of signal transmission.

Example Three

For the first-stage AP, $\hat{H}_l$ is obtained by estimating the channel according to the pilot portion of $Y_1$. $X_1=\hat{H}_1^{H}\cdot Y_1$ is determined according to $\hat{H}_1$. $R_1^{-1}=(\hat{H}_1^{H}\cdot H_1+\sigma^2 I_K)^{-1}$ is determined by using the Sherman-Morrison formula for N times. $R_1$ denotes an Hermite matrix with a dimension of K×K. The first-stage AP transmits $X_1$ and $R_1^{-1}$ to the second-stage AP. For the l-th stage AP, l<l≤L. $\hat{H}_l$ is obtained by estimating the channel according to the pilot portion of $Y_l$. $X_l=X_{l-1}+\hat{H}_l^{H}\cdot Y_l$ is determined according to $\hat{H}_l$. $R_l^{-1}=(R_{l-1}+\hat{H}_l^{H}\cdot H_l)^{-1}$ is determined by using the Sherman-Morrison formula for N times. $R_l$ is an Hermite matrix with a dimension of K×K. In the case of l<L, the l-th stage AP transmits $X_l$ and $R_l$ to the (l+1)-th stage AP. In the case of l=L, the L-th stage AP transmits $X_L$ and $R_L$ to the CPU.

The CPU determines the signal $X_{est}=R_L^{-1}X_L$ for demodulation according to $X_L$ and $R_L$ which are transmitted by the L-th stage AP.

In this example, an AP of each stage contains multiple antennas. The first inter-user interference information matrix is the inverse matrix of the sum of a correlation matrix of a multi-user channel and a noise diagonal matrix. For the l-th stage AP, $\hat{H}_l$ is first determined according to the pilot portion of a received signal. On this basis, the process of calculating $\hat{H}_l^{H}\cdot Y_l$ and $\hat{H}_l^{H}\cdot\hat{H}_l$ may be performed in parallel, thereby reducing the processing delay in the process of signal transmission.

Example Four

For the first-stage AP, $\hat{H}_1$ is obtained by estimating the channel according to the pilot portion of $Y_1$ and correlation matrix prior information of a multi-user channel. $X_1=\hat{H}_1^{H}\cdot Y_1$ and $R_1=\hat{H}_1^{H}\cdot\hat{H}_1+\sigma^2 I_K$ are determined according to $\hat{H}_1$. $R_1$ denotes an Hermite matrix with a dimension of K×K. The first-stage AP transmits $X_1$ and $R_1$ to the second-stage AP. For the l-th stage AP, l<l≤L. $\hat{H}_l$ is obtained by estimating the channel according to the pilot portion of $Y_l$. $X_l=X_{l-1}+\hat{H}_l^{H}\cdot Y_l$ and $R_l=R_{l-1}+\hat{H}_l^{H}\cdot\hat{H}_l$ are determined according to $\hat{H}_l$. $R_l$ is an Hermite matrix with a dimension of K×K. In the case of l<L, the l-th stage AP transmits $X_l$ and Rr to the (l+1)-th stage AP. In the case of l=L, the L-th stage AP transmits $X_L$ and $R_L$ to the CPU.

The CPU determines the signal $X_{est}=R_L^{-1}X_L$ for demodulation according to $X_L$ and $R_L$ which are transmitted by the L-th stage AP.

In this example, an AP of each stage contains multiple antennas. The first inter-user interference information matrix is the sum of a correlation matrix of a multi-user channel and a noise diagonal matrix. For the l-th stage AP, $\hat{H}_l$ is first determined according to the pilot portion of a received signal and correlation matrix prior information of a multi-user channel. On this basis, the process of calculating $\hat{H}_l^{H}\cdot Y_l$ and $\hat{H}_l^{H}\cdot\hat{H}_l$ may be performed in parallel, thereby reducing the processing delay in the process of signal transmission.

Example Five

For the first-stage AP, $\hat{h}_1$ is obtained by estimating the channel according to the pilot portion of $Y_1$. $X_1=\hat{h}_1^{H}\cdot Y_1$ and $R_1=\hat{h}_1^{H}\cdot\hat{h}_1+\sigma^2 I_K$ are determined according to $\hat{h}_1$. $R_1$ denotes an Hermite matrix with a dimension of K×K. The first-stage AP transmits $X_1$ and $R_1$ to the second-stage AP. For the l-th stage AP, l<l≤L. $\hat{h}_l$ is obtained by estimating the channel according to the pilot portion of $Y_l$. $X_l=X_{l-1}+\hat{h}_l^{H}\cdot Y_l$ and $R_l=R_{l-1}+\hat{h}_l^{H}\cdot\hat{h}_l$ are determined according to $\hat{h}_l$. $R_l$ is an Hermite matrix with a dimension of K×K. In the case of l<L, the l-th stage AP transmits $X_l$ and $R_l$ to the (l+1)-th stage AP. In the case of l=L, the L-th stage AP transmits $X_L$ and $R_L$ to the CPU.

The CPU determines the signal $X_{est}=R_L^{-1}X_L$ for demodulation according to $X_L$ and $R_L$ which are transmitted by the L-th stage AP.

In this example, an AP of each stage contains one antenna. The first inter-user interference information matrix is the sum of a correlation matrix of a multi-user channel and a noise diagonal matrix. For the l-th stage AP, $\hat{h}_l$ is first determined according to the pilot portion of a received signal. On this basis, the process of calculating $\hat{h}_l^{H}\cdot Y_l$ and $\hat{h}_l^{H}\cdot\hat{h}_l$ may be performed in parallel, thereby reducing the processing delay in the process of signal transmission.

Example Six

For the first-stage AP, $\hat{h}_l$ is obtained by estimating the channel according to the pilot portion of $Y_1$. $X_1=\hat{h}_1^{H}\cdot Y_1$ and $R_1=\hat{h}_1^{H}\cdot\hat{h}_1$ are determined according to $\hat{h}_1$. $R_1$ denotes an Hermite matrix with a dimension of K×K. The first-stage AP transmits $X_1$ and $R_1$ to the second-stage AP. For the l-th stage AP, l<l≤L. $\hat{h}_l$ is obtained by estimating the channel according to the pilot portion of $Y_l$. $X_l=X_{l-1}+\hat{h}_l^{H}\cdot Y_l$ and $R_l=R_{l-1}+$ $\hat{h}_l{}^H \cdot \hat{h}_l$ are determined according to $\hat{h}_l$. $R_l$ is an Hermite matrix with a dimension of K×K. In the case of l<L, the l-th stage AP transmits $X_l$ and $R_l$ to the (l+1)-th stage AP. In the case of l=L, the L-th stage AP transmits $X_L$ and $R_L$ to the CPU.

The CPU determines the signal $X_{est}=(R_L+\sigma^2 I_K)^{-1} X_L$ for demodulation according to $X_L$ and $R_L$ which are transmitted by the L-th stage AP.

In this example, an AP of each stage contains one antenna. The first inter-user interference information matrix is a correlation matrix of a multi-user channel. For the l-th stage AP, $\hat{h}_l$ is first determined according to the pilot portion of a received signal. On this basis, the process of calculating $\hat{h}_l$ and $\hat{h}_l{}^H \cdot \hat{h}_l$ may be performed in parallel, thereby reducing the processing delay in the process of signal transmission.

Example Seven

For the first-stage AP, $\hat{h}_l$ is obtained by estimating the channel according to the pilot portion of $Y_1$. $X_1=\hat{h}_1{}^H \cdot Y_1$ is determined according to $\hat{h}_1$. $R_1{}^{-1}=(\hat{h}_1{}^H \cdot \hat{h}_1+\sigma^2 I_K)^{-1}$ is determined by using the Sherman-Morrison formula for one time. $R_1$ denotes an Hermite matrix with a dimension of K×K. The first-stage AP transmits $X_1$ and $R_1{}^{-1}$ to the second-stage AP. For the l-th stage AP, 1<l≤L. $\hat{h}_l$ is obtained by estimating the channel according to the pilot portion of $Y_l$. $X_l=X_{l-1}+\hat{h}_l{}^H \cdot Y_l$ is determined according to $\hat{h}_l$. $R_l{}^{-1}=(R_{l-1}+\hat{h}_l{}^H \cdot \hat{h}_l)^{-1}$ is determined by using the Sherman-Morrison formula for N times. $R_l$ is an Hermite matrix with a dimension of K×K. In the case of l<L, the l-th stage AP transmits $X_l$ and $R_l$ to the (l+1)-th stage AP. In the case of l=L, the L-th stage AP transmits $X_L$ and $R_L$ to the CPU.

The CPU determines the signal $X_{est}=R_L{}^{-1} X_L$ for demodulation according to $X_L$ and $R_L$ which are transmitted by the L-th stage AP.

In this example, an AP of each stage contains one antenna. The first inter-user interference information matrix is the inverse matrix of the sum of a correlation matrix of a multi-user channel and a noise diagonal matrix. For the l-th stage AP, $\hat{h}_l$ is first determined according to the pilot portion of a received signal. On this basis, the process of calculating $\hat{h}_l{}^H \cdot Y_l$ and $\hat{h}_l{}^H \cdot \hat{h}_l$ may be performed in parallel, thereby reducing the processing delay in the process of signal transmission.

Example Eight

For the first-stage AP, $\hat{h}_l$ is obtained by estimating the channel according to the pilot portion of $Y_1$ and energy prior information of a multi-user channel. $X_1=\hat{h}_1{}^H \cdot Y_1$ and $R_1=\hat{h}_1{}^H \cdot \hat{h}_1+\sigma^2 I_K$ are determined according to $\hat{h}_1$. $R_1$ denotes an Hermite matrix with a dimension of K×K. The first-stage AP transmits $X_1$ and $R_1$ to the second-stage AP. For the l-th stage AP, 1<l≤L. $\hat{h}_l$ is obtained by estimating the channel according to the pilot portion of $Y_l$. $X_l=X_{l-1}+\hat{h}_l{}^H \cdot Y_l$ and $R_l=R_{l-1}+\hat{h}_l{}^H \cdot \hat{h}_l$ are determined according to $\hat{h}_l$. $R_l$ is an Hermite matrix with a dimension of K×K. In the case of l<L, the l-th stage AP transmits $X_l$ and $R_l$ to the (l+1)-th stage AP. In the case of l=L, the L-th stage AP transmits $X_L$ and $R_L$ to the CPU.

The CPU determines the signal $X_{est}=R_L{}^{-1} X_L$ for demodulation according to $X_L$ and $R_L$ which are transmitted by the L-th stage AP.

In this example, an AP of each stage contains one antenna. The first inter-user interference information matrix is a correlation matrix of a multi-user channel. For the l-th stage AP, $\hat{H}_l$ is first determined according to the pilot portion of a received signal and energy prior information of a multi-user channel. On this basis, the process of calculating $\hat{h}_l{}^H \cdot Y_l$ and $\hat{h}_l{}^H \cdot \hat{h}_l$ may be performed in parallel, thereby reducing the processing delay in the process of signal transmission.

In the embodiments of the present application, a signal transmission method is also provided. The method is applied by a CPU. The CPU may be a centralized control unit on a network side, such as a CPU, a network management device, or a base station. The CPU recovers the signal for demodulation through receiving the multi-user uplink data signal and the first inter-user interference information matrix which are transmitted by the last-stage AP in the front-haul link. Thus, the demodulation performance is improved, and the demodulated signal has higher signal-to-noise ratio.

FIG. 3 is a flowchart of another signal transmission method according to an embodiment. As shown in FIG. 3, the method provided in this embodiment includes operation 210 and operation 220. For technical details not described in detail in this embodiment, reference may be made to any one of the preceding embodiments.

In operation 210, a multi-user uplink data signal and a first inter-user interference information matrix which are transmitted by the last-stage AP in a front-haul link are received.

In operation 220, a signal for demodulation is determined according to the multi-user uplink data signal and the first inter-user interference information matrix.

In this embodiment, the multi-user uplink data signal includes uplink data signals sent by multiple terminals to the CPU through the last-stage AP. Each uplink data signal contains uplink data transmitted by a corresponding terminal. In addition, a corresponding multi-user uplink data signal transmitted from the upper-stage AP of the last-stage AP to the last-stage AP is also included. That is, the multi-user uplink data signal of the last-stage AP is a result of combining the multi-user uplink data signal determined by the last-stage AP according to the channel estimation with the multi-user uplink data signal corresponding to the upper-stage AP.

The first inter-user interference information matrix is used for indicating interference between an uplink data signal sent by each terminal and uplink data signals sent by other terminals. The first inter-user interference information matrix is also affected by the first inter-user interference information matrix corresponding to the upper-stage AP transmitted by the upper-stage AP of the last-stage AP. That is, the first inter-user interference information matrix of the last-stage AP is a result of combining the first inter-user interference information matrix determined by the last-stage AP according to the channel estimation with the first inter-user interference information matrix corresponding to the upper-stage AP.

In an embodiment, a signal for demodulation includes the product of a first matrix and a multi-user uplink data signal. The first matrix is the inverse matrix of the sum of a first inter-user interference information matrix and a noise diagonal matrix. Alternatively, a signal for demodulation includes the product of a second matrix and a multi-user uplink data signal. The second matrix is the inverse matrix of a first inter-user interference information matrix.

The CPU receives the multi-user uplink data signal (that is, $X_L$ in the preceding examples) and the first inter-user interference information matrix (that is, $R_L$ in the preceding examples) which are transmitted by the last-stage AP (that is, the L-th stage AP in the preceding examples) to determine a signal for demodulation. For example, the signal for demodulation is the product of a first matrix $(R_L+\sigma^2 I_K)^{-1}$ and $X_L$, that is $X_{est}=(R_L+\sigma^2 I_K)^{-1} X_L$. In this case, the first inter-user interference information matrix is a correlation matrix of a multi-user channel. In another example, the signal used for demodulation is the product of a second matrix $R_L{}^{-1}$ and a multi-user uplink data signal $X_L$, that is, $X_{est}=R_L{}^{-1}X_L$. In this case, the first inter-user interference information matrix is a correlation matrix of a multi-user channel, the sum of a correlation matrix of a multi-user channel and a noise diagonal matrix, or the inverse matrix of the sum of a correlation matrix of a multi-user channel and a noise diagonal matrix.

In an embodiment, an AP of each stage in the front-haul link is provided with at least one antenna. The number of row vectors of the first inter-user interference information matrix and the number of column vectors of the first inter-user interference information matrix are equal, and both are equal to the number of users. The number of row vectors of the multi-user uplink data signal is equal to the number of users. The number of column vectors of the multi-user uplink data signal is equal to the number of data symbols of received signals on a single antenna of the current AP.

In an embodiment, the AP determines the channel estimation according to the pilot portion of a received signal. Alternatively, the AP determines the channel estimation according to the pilot portion of a received signal and correlation matrix prior information of a multi-user channel. Alternatively, the AP determines the channel estimation according to the pilot portion of a received signal and energy prior information of a multi-user channel.

In an embodiment, for the first-stage AP, the multi-user uplink data signal corresponding to the first-stage AP is obtained according to the conjugate matrix of the channel estimation of the first-stage AP. For a non-first-stage AP, the multi-user uplink data signal corresponding to the non-first-stage AP is obtained by superimposing a current multi-user uplink data signal with the multi-user uplink data signal output from the upper-stage AP. The current multi-user uplink data signal is obtained according to the conjugate matrix of the channel estimation of the non-first-stage AP.

In an embodiment, for the first-stage AP, the first inter-user interference information matrix corresponding to the first-stage AP is obtained according to the channel estimation of the first-stage AP. For a non-first-stage AP, the first inter-user interference information matrix corresponding to the non-first-stage AP is obtained by superimposing a current first inter-user interference information matrix with the first inter-user interference information matrix output from the upper-stage AP. The current first inter-user interference information matrix is obtained according to the channel estimation of the non-first-stage AP.

In an embodiment, the first inter-user interference information matrix includes one of the following: a correlation matrix of a multi-user channel; the sum of a correlation matrix of a multi-user channel and a noise diagonal matrix; or the inverse matrix of the sum of a correlation matrix of a multi-user channel and a noise diagonal matrix.

In the embodiments of the present application, a signal transmission method is also provided. The method is applied by an AP of each stage in the front-haul link. In the case where the CPU sends downlink data signals to multiple terminals through a front-haul link of an AP of at least one stage, a transmit signal is determined according to the acquired multi-user downlink data signal and a second inter-user interference information matrix, thereby improving signal-to-noise ratio of a signal received by a terminal.

FIG. 4 is a flowchart of another signal transmission method according to an embodiment. As shown in FIG. 4, the method provided in this embodiment includes operation 310 and operation 320. For technical details not described in detail in this embodiment, reference may be made to any one of the preceding embodiments.

In operation 310, related information of a multi-user downlink data signal and a second inter-user interference information matrix is acquired.

In operation 320, the transmit signal of a current AP is determined according to the related information of the multi-user downlink data signal and the second inter-user interference information matrix and the channel estimation of the current AP.

In this embodiment, the multi-user downlink data signal includes downlink data signals sent by a CPU to multiple terminals through an AP of at least one stage. Each downlink data signal contains downlink data transmitted to a corresponding terminal. The second inter-user interference information matrix is used for indicating the interference between the downlink data signals sent by the CPU to the multiple terminals through an AP of at least one stage.

In an embodiment, related information includes a multi-user downlink data signal and a second inter-user interference information matrix. Alternatively, the related information includes the product signal of a multi-user downlink data signal and a second inter-user interference information matrix.

In an embodiment, a second inter-user interference information matrix includes the inverse matrix of the sum of a correlation matrix of a multi-user channel and a noise diagonal matrix.

In an embodiment, in the case where related information includes a multi-user downlink data signal and a second inter-user interference information matrix, the multi-user downlink data signal is sent by a CPU, and the second inter-user interference information matrix is determined by the last-stage AP in a front-haul link or sent by the CPU. In the case where the related information includes the product signal of the multi-user downlink data signal and the second inter-user interference information matrix, the product signal is sent by the CPU.

In this embodiment, in one case, the CPU may send the multi-user downlink data signal to an AP of each stage, and the manner in which the AP of each stage acquires the second inter-user interference information matrix may be the manner in which the second inter-user interference information matrix is sent by the CPU or the manner in which the second inter-user interference information matrix is determined by the last-stage AP (that is, the L-th stage AP, that is, the AP directly connected to the CPU) in the front-haul link. Alternatively, the CPU may send the product signal of the multi-user downlink data signal and the second inter-user interference information matrix to an AP of each stage for the AP of each stage to determine the transmit signal.

In an embodiment, a multi-user downlink data signal includes a multi-user data signal matrix or a multi-user bit data matrix. The multi-user data signal matrix refers to a matrix composed of modulated data symbols to be sent to multiple users. The multi-user bit data matrix refers to a matrix composed of bit data to be sent to multiple users.

In this embodiment, the multi-user downlink data signal may be in the form of a data signal matrix or in the form of a bit data matrix. This can save transmission overhead.

In an embodiment, operation 330 is also included.

In operation 330, in the case where the current AP is the last-stage AP in the front-haul link, the second inter-user interference information matrix is sent to each non-last-stage AP in the front-haul link.

In this embodiment, the last-stage AP may determine the second inter-user interference information matrix corresponding to the last-stage AP and send corresponding second inter-user interference information matrixes to APs of other stages in the front-haul link.

In an embodiment, a transmit signal includes the product of the channel estimation of a current AP, a second inter-user interference information matrix, and a multi-user downlink data signal, or the product of the channel estimation of a current AP and a product signal.

The process of signal transmission is described by examples below. In the following examples, the multi-user data signal matrix is denoted as S. The multi-user bit data matrix is denoted as B. l denotes the stage number of the current AP. $l \geq 1$, and $l \leq L$. L denotes the total number or the total stage number of the AP. $\sigma^2$ denotes the noise of the received signal. $I_K$ denotes the identity matrix of K×K. The second inter-user interference information matrix is denoted as $(\hat{H}^H \cdot \hat{H} + \sigma^2 I_K)^{-1}$. In the case where the current AP contains multiple antennas, the channel estimation of the current AP is denoted as $\hat{H}_l$. In the case where the current AP contains one antenna, the channel estimation of the current AP is denoted as $\hat{h}_l$.

Example Nine

The CPU sends S and $\hat{H}^H \cdot \hat{H} + \sigma^2 I_K)^{-1}$ to an AP of each stage. $\hat{H} = [\hat{H}_1^T, \hat{H}_2^T, \ldots, \hat{H}_L^T]^T$, and T denotes the transposition of a matrix. For the l-th stage AP, $1 \leq l \leq L$. The transmit signal is determined to be $\hat{H}_l (\hat{H}^H \cdot \hat{H} + \sigma I_K)^{-1} S$ according to the received S, $(\hat{H}^H \cdot \hat{H} + \sigma^2 I_K)^{-1}$, and $\hat{H}_l$.

In this example, an AP of each stage contains multiple antennas. The second inter-user interference information matrix is the inverse matrix of the sum of a correlation matrix of a multi-user channel and a noise diagonal matrix.

Example Ten

The CPU sends B to an AP of each stage. The L-th stage AP sends $(\hat{H}^H \cdot \hat{H} + \sigma^2 I_K)^{-1}$ to APs of other stages in the front-haul link. $\hat{H} = [\hat{H}_1^T, \hat{H}_2^T, \ldots, \hat{H}_L^T]^T$, and T denotes the transposition of a matrix. For the l-th stage Ag $1 \leq l \leq L$. The transmit signal is determined to be $\hat{H}_l (\hat{H}^H \cdot \hat{H} + \sigma^2 I_K)^{-1} B$ according to the received B, $(\hat{H}^H \cdot \hat{H} + \sigma^2 I_K)^{-1}$, and $\hat{H}_l$.

In this example, an AP of each stage contains multiple antennas. The second inter-user interference information matrix is the inverse matrix of the sum of a correlation matrix of a multi-user channel and a noise diagonal matrix.

Example Eleven

The CPU sends the product signal of S and $(\hat{H}^H \cdot \hat{H} + \sigma^2 I_K)^{-1}$, that is, $(\hat{H}^H \cdot \hat{H} + \sigma^2 I_K)^{-1} S$, to an AP of each stage. $\hat{H} = [\hat{H}_1^T, \hat{H}_2^T, \ldots, \hat{H}_L^T]^T$, and T denotes the transposition of a matrix. For the l-th stage AP, $1 \leq l \leq L$. The transmit signal is determined to be $\hat{H}_l (\hat{H}^H \cdot \hat{H} + \sigma^2 I_K)^{-1} S$ according to the received $(\hat{H}^H \cdot \hat{H} + \sigma^2 I_K)^{-1} S$ and $\hat{H}_l$.

In this example, an AP of each stage contains multiple antennas. The second inter-user interference information matrix is the inverse matrix of the sum of a correlation matrix of a multi-user channel and a noise diagonal matrix.

Example Twelve

The CPU sends S and $(\hat{H}^H \cdot \hat{H} + \sigma^2 I_K)^{-1}$ to an AP of each stage. $\hat{H} = [\hat{h}_1^T, \hat{h}_2^T, \ldots, \hat{h}_L^T]^T$, and T denotes the transposition of a matrix. For the l-th stage AP, $1 \leq l \leq L$. The transmit signal is determined to be $\hat{H}_l (\hat{H}^H \cdot \hat{H} + \sigma^2 I_K)^{-1} S$ according to the received S, $(\hat{H}^H \cdot \hat{H} + \sigma^2 I_K)^{-1}$, and $\hat{H}_l$.

In this example, an AP of each stage contains one antenna. The second inter-user interference information matrix is the inverse matrix of the sum of a correlation matrix of a multi-user channel and a noise diagonal matrix.

Example Thirteen

The CPU sends B to an AP of each stage. The L-th stage AP sends $(\hat{H}^H \cdot \hat{H} + \sigma^2 I_K)^{-1}$ to APs of other stages in the front-haul link. $\hat{H} = [\hat{h}_1^T, \hat{h}_2^T, \ldots, \hat{h}_L^T]^T$, and T denotes the transposition of a matrix. For the l-th stage AP, $1 \leq l \leq L$. The transmit signal is determined to be $\hat{H}_l (\hat{H}^H \cdot \hat{H} + \sigma^2 I_K)^{-1} B$ according to the received B, $(\hat{H}^H \cdot \hat{H} + \sigma^2 I_K)^{-1}$, and $\hat{H}_l$.

In this example, an AP of each stage contains one antenna. The second inter-user interference information matrix is the inverse matrix of the sum of a correlation matrix of a multi-user channel and a noise diagonal matrix.

Example Fourteen

The CPU sends the product signal of S and $(\hat{H}^H \cdot \hat{H} + \sigma^2 I_K)^{-1}$, that is, $(\hat{H}^H \cdot \hat{H} + \sigma^2 I_K)^{-1} S$, to an AP of each stage. $\hat{H} = [\hat{h}_1^T, \hat{h}_2^T, \ldots, \hat{h}_L^T]^T$, and T denotes the transposition of a matrix. For the l-th stage AP, $1 \leq l \leq L$. The transmit signal is determined to be $\hat{H}_l (\hat{H}^H \cdot \hat{H} + \sigma^2 I_K)^{-1} S$ according to the received $(\hat{H}^H \cdot \hat{H} + \sigma^2 I_K)^{-1} S$ and $\hat{H}_l$.

In this example, an AP of each stage contains one antenna. The second inter-user interference information matrix is the inverse matrix of the sum of a correlation matrix of a multi-user channel and a noise diagonal matrix.

In the embodiments of the present application, a signal transmission method is also provided. The method is applied by a CPU. The CPU may be a centralized control unit on a network side, such as a CPU, a network management device, or a main base station. The CPU sends a multi-user downlink data signal to an AP of each stage for the AP of each stage to determine a transmit signal, thereby improving the signal-to-noise ratio of the signal received by a terminal.

FIG. 5 is a flowchart of another signal transmission method according to an embodiment. As shown in FIG. 5, the method provided in this embodiment includes operation 410. For technical details not described in detail in this embodiment, reference may be made to any one of the preceding embodiments.

In operation 410, a multi-user downlink data signal or the product signal of a multi-user downlink data signal and a second inter-user interference information matrix is sent to an AP of each stage in a front-haul link.

In this embodiment, the multi-user downlink data signal includes downlink data signals sent by a CPU to multiple terminals through an AP of at least one stage. Each downlink data signal contains downlink data transmitted to a corresponding terminal.

In an embodiment, in the case where the multi-user downlink data signal is sent to the AP of each stage in the front-haul link, the method also includes operation 420.

In operation 420, a second inter-user interference information matrix is sent to the AP of each stage in the front-haul link.

In this embodiment, the second inter-user interference information matrix is used for indicating the interference between the downlink data signals sent by the CPU to the multiple terminals through an AP of at least one stage.

In an embodiment, a second inter-user interference information matrix includes the inverse matrix of the sum of a correlation matrix of a multi-user channel and a noise diagonal matrix.

In an embodiment, a multi-user downlink data signal includes a multi-user data signal matrix or a multi-user bit data matrix.

The embodiments of the present application also provide a signal transmission apparatus. FIG. 6 is a diagram illustrating the structure of a signal transmission apparatus according to an embodiment. As shown in FIG. 6, the signal transmission apparatus includes a multi-user signal determination module 11 and a first cascade transmission module 12.

The multi-user signal determination module 11 is configured to, according to the channel estimation of a current AP, determine a multi-user uplink data signal and a first inter-user interference information matrix which correspond to the current AP. The first cascade transmission module 12 is configured to transmit the multi-user uplink data signal and the first inter-user interference information matrix to the next-stage node of the current AP in a front-haul link.

According to the signal transmission apparatus in this embodiment, in the case where multiple terminals send uplink data signals to a CPU through an AP of at least one stage, on the basis of processing the received data signal sent by each user to reduce the load of the front-haul link, the reliability of receiving data signals by the CPU is improved through transmitting the multi-user uplink data signal and the first inter-user interference information matrix, and the signal-to-noise ratio in the process of signal transmission is improved through analyzing and transmitting the interference between multiple users.

In an embodiment, an AP of each stage in the front-haul link is provided with at least one antenna. The number of row vectors of the first inter-user interference information matrix and the number of column vectors of the first inter-user interference information matrix are equal, and both are equal to the number of users. The number of row vectors of the multi-user uplink data signal is equal to the number of users. The number of column vectors of the multi-user uplink data signal is equal to the number of data symbols of received signals on a single antenna of the current AP.

In an embodiment, an estimation module is also included and is configured to determine the channel estimation according to the pilot portion of a received signal; determine the channel estimation according to the pilot portion of a received signal and correlation matrix prior information of a multi-user channel; or determine the channel estimation according to the pilot portion of a received signal and energy prior information of a multi-user channel.

In an embodiment, the multi-user signal determination module 11 includes a first determination unit. The first determination unit is configured to, in the case where the current AP is a first-stage AP, obtain the multi-user uplink data signal corresponding to the current AP according to a conjugate matrix of the channel estimation of the current AP; and in the case where the current AP is not a first-stage AP, obtain a current multi-user uplink data signal according to the conjugate matrix of the channel estimation of the current AP, and superimpose the current multi-user uplink data signal with a multi-user uplink data signal output from the upper-stage AP of the current AP to obtain the multi-user uplink data signal corresponding to the current AP.

In an embodiment, the multi-user signal determination module 11 includes a second determination unit. The second determination unit is configured to, in the case where the current AP is a first-stage AP, obtain the first inter-user interference information matrix corresponding to the current AP according to the channel estimation of the current AP; and in the case where the current AP is not a first-stage AP, obtain a current first inter-user interference information matrix according to the channel estimation of the current AP, and superimpose the current first inter-user interference information matrix with a first inter-user interference information matrix output from the upper-stage AP of the current AP to obtain the first inter-user interference information matrix corresponding to the current AP.

In an embodiment, the first inter-user interference information matrix includes one of the following: a correlation matrix of a multi-user channel; the sum of a correlation matrix of a multi-user channel and a noise diagonal matrix; or the inverse matrix of the sum of a correlation matrix of a multi-user channel and a noise diagonal matrix.

The signal transmission apparatus provided in this embodiment and the signal transmission method applied by an AP in the preceding embodiments belong to the same concept. For technical details not described in detail in this embodiment, reference may be made to any one of the preceding embodiments. This embodiment has the same effects as the executed signal transmission method applied by an AP.

The embodiments of the present application also provide a signal transmission apparatus. FIG. 7 is a diagram illustrating the structure of another signal transmission apparatus according to an embodiment. As shown in FIG. 7, the signal transmission apparatus includes a reception module 21 and a demodulation signal determination module 22.

The reception module 21 is configured to receive a multi-user uplink data signal and a first inter-user interference information matrix which are transmitted by the last-stage AP in a front-haul link. The demodulation signal determination module 22 is configured to determine a signal for demodulation according to the multi-user uplink data signal and the first inter-user interference information matrix.

According to the signal transmission apparatus in this embodiment, the signal for demodulation is determined through receiving the multi-user uplink data signal and the first inter-user interference information matrix which are recovered by the last-stage AP in the front-haul link. Thus, the demodulation performance is improved, and the demodulated signal has higher signal-to-noise ratio.

In an embodiment, the signal for demodulation includes the product of a first matrix and a multi-user uplink data signal. The first matrix is the inverse matrix of the sum of a first inter-user interference information matrix and a noise diagonal matrix. Alternatively, the signal for demodulation includes the product of a second matrix and a multi-user uplink data signal. The second matrix is the inverse matrix of a first inter-user interference information matrix.

In an embodiment, an AP of each stage in the front-haul link is provided with at least one antenna. The number of row vectors of the first inter-user interference information matrix and the number of column vectors of the first inter-user interference information matrix are equal, and both are equal to the number of users. The number of row vectors of the multi-user uplink data signal is equal to the number of users. The number of column vectors of the multi-user uplink data signal is equal to the number of data symbols of received signals on a single antenna of the current AP.

In an embodiment, for the first-stage AP, the multi-user uplink data signal corresponding to the first-stage AP is obtained according to the conjugate matrix of the channel estimation of the first-stage AP. For a non-first-stage AP, the multi-user uplink data signal corresponding to the non-first-stage AP is obtained by superimposing a current multi-user uplink data signal with the multi-user uplink data signal output from the upper-stage AP. The current multi-user uplink data signal is obtained according to the conjugate matrix of the channel estimation of the non-first-stage AP.

In an embodiment, for the first-stage AP, the first inter-user interference information matrix corresponding to the first-stage AP is obtained according to the channel estimation of the first-stage AP. For a non-first-stage AP, the first inter-user interference information matrix corresponding to the non-first-stage AP is obtained by superimposing a current first inter-user interference information matrix with the first inter-user interference information matrix output from the upper-stage AP. The current first inter-user interference information matrix is obtained according to the channel estimation of the non-first-stage AP.

In an embodiment, the first inter-user interference information matrix includes one of the following: a correlation matrix of a multi-user channel; the sum of a correlation matrix of a multi-user channel and a noise diagonal matrix; or the inverse matrix of the sum of a correlation matrix of a multi-user channel and a noise diagonal matrix.

The signal transmission apparatus provided in this embodiment and the signal transmission method applied by a CPU in the preceding embodiments belong to the same concept. For technical details not described in detail in this embodiment, reference may be made to any one of the preceding embodiments. This embodiment has the same effects as the executed signal transmission method applied by a CPU.

The embodiments of the present application also provide a signal transmission apparatus. FIG. 8 is a diagram illustrating the structure of another signal transmission apparatus according to an embodiment. As shown in FIG. 8, the information transmission apparatus includes an acquisition module 31 and a transmit module 32.

The acquisition module 31 is configured to acquire related information of a multi-user downlink data signal and a second inter-user interference information matrix. The transmit module 32 is configured to determine a transmit signal of a current AP according to the related information of the multi-user downlink data signal and the second inter-user interference information matrix and the channel estimation of the current AP.

According to the signal transmission apparatus in this embodiment, in the case where the CPU sends downlink data signals to multiple terminals through a front-haul link of an AP of at least one stage, a transmit signal is determined according to the acquired multi-user downlink data signal and a second inter-user interference information matrix, thereby improving signal-to-noise ratio of a signal received by a terminal.

In an embodiment, the related information includes a multi-user downlink data signal and a second inter-user interference information matrix. Alternatively, the related information includes the product signal of a multi-user downlink data signal and a second inter-user interference information matrix.

In an embodiment, the second inter-user interference information matrix includes the inverse matrix of the sum of a correlation matrix of a multi-user channel and a noise diagonal matrix.

In an embodiment, the multi-user downlink data signal is sent by the CPU. The second inter-user interference information matrix is determined by the last-stage AP in the front-haul link or sent by the CPU. The product signal is sent by the CPU.

In an embodiment, the multi-user downlink data signal includes a multi-user data signal matrix or a multi-user bit data matrix.

In an embodiment, a second inter-user interference information matrix sending module is also included.

The second inter-user interference information matrix sending module is configured to, in the case where the current AP is the last-stage AP in the front-haul link, send a second inter-user interference information matrix to each non-last-stage AP in the front-haul link.

In an embodiment, a transmit signal includes the product of the channel estimation of a current AP, a second inter-user interference information matrix, and a multi-user downlink data signal, or the product of the channel estimation of a current AP and a product signal.

The signal transmission apparatus provided in this embodiment and the signal transmission method applied by an AP in the preceding embodiments belong to the same concept. For technical details not described in detail in this embodiment, reference may be made to any one of the preceding embodiments. This embodiment has the same effects as the executed signal transmission method applied by an AP.

The embodiments of the present application also provide a signal transmission apparatus. FIG. 9 is a diagram illustrating the structure of another signal transmission apparatus according to an embodiment. As shown in FIG. 9, the signal transmission apparatus includes a second cascade transmission module 41.

The second cascade transmission module 41 is configured to send a multi-user downlink data signal or a product signal of a multi-user downlink data signal and a second inter-user interference information matrix to an AP of each stage in a front-haul link.

According to the signal transmission apparatus in this embodiment, a multi-user downlink data signal is sent to an AP of each stage for the AP of each stage to determine a transmit signal, thereby improving the signal-to-noise ratio of the signal received by a terminal.

In an embodiment, in the case of sending the multi-user downlink data signal to the AP of each stage in the front-haul link, a third cascade transmission module is also included.

The third cascade transmission module is configured to send a second inter-user interference information matrix to the AP of each stage in the front-haul link.

The signal transmission apparatus provided in this embodiment and the signal transmission method applied by a CPU in the preceding embodiments belong to the same concept. For technical details not described in detail in this embodiment, reference may be made to any one of the preceding embodiments. This embodiment has the same effects as the executed signal transmission method applied by a CPU.

The embodiments of the present application also provide an access point. The access point is, for example, a distributed base station or a baseband processing unit of a base station antenna. Signals are transmitted between multiple terminals and a CPU through an access node of at least one stage.

FIG. 10 is a diagram illustrating the structure of hardware of an access point according to an embodiment. As shown in FIG. 10, the access point provided in the present application includes one or more processors 51. The one or more processors 51, when executed, implement the signal transmission method applied by an AP provided in any embodiment of the present application.

The access point may also include a storage apparatus 52. One or more processors 51 may be provided in the access point, and one processor 51 is used as an example in FIG. 10. The storage apparatus 52 is configured to store one or more programs. When executed by the one or more processors 51, the one or more programs cause the one or more processors 51 to implement the signal transmission method applied by an AP as described in the embodiments of the present application.

The access point also includes a communication apparatus 53, an input apparatus 54, and an output apparatus 55.

The processor 51, the storage apparatus 52, the communication apparatus 53, the input apparatus 54, and the output apparatus 55 that are in the access point may be connected through a bus or in other manners. In FIG. 10, the connection through the bus is used as an example.

The input apparatus 54 may be configured to receive inputted digital or character information and generate key signal input related to user settings and function control of the access point. The output apparatus 55 may include display devices such as a display screen.

The communication apparatus 53 may include a receiver and a sender. The communication apparatus 53 is configured to perform information transceiving communication under the control of the processor 51.

As a computer-readable storage medium, the storage apparatus 52 may be configured to store software programs, computer-executable programs and modules, such as program instructions/modules (for example, the multi-user signal determination module 11 and the first cascade transmission module 12 that are in the signal transmission apparatus; in another example, the acquisition module 31 and the transmit module 32 that are in the signal transmission apparatus) corresponding to the signal transmission method applied by an AP described in the embodiments of the present application. The storage apparatus 52 may include a program storage area and a data storage area. The program storage area may store an operating system and an application program required by at least one function. The data storage area may store data created depending on use of an access point. Additionally, the storage apparatus 52 may include a high-speed random-access memory and may also include a nonvolatile memory, such as at least one magnetic click memory, a flash memory, or another nonvolatile solid-state memory. In some examples, the storage apparatus 52 may include memories which are remotely disposed relative to the processor 51. These remote memories may be connected to the access point via a network. Examples of the preceding network include, but are not limited to, the Internet, an intranet, a local area network, a mobile communication network, and a combination thereof.

Figure 11:
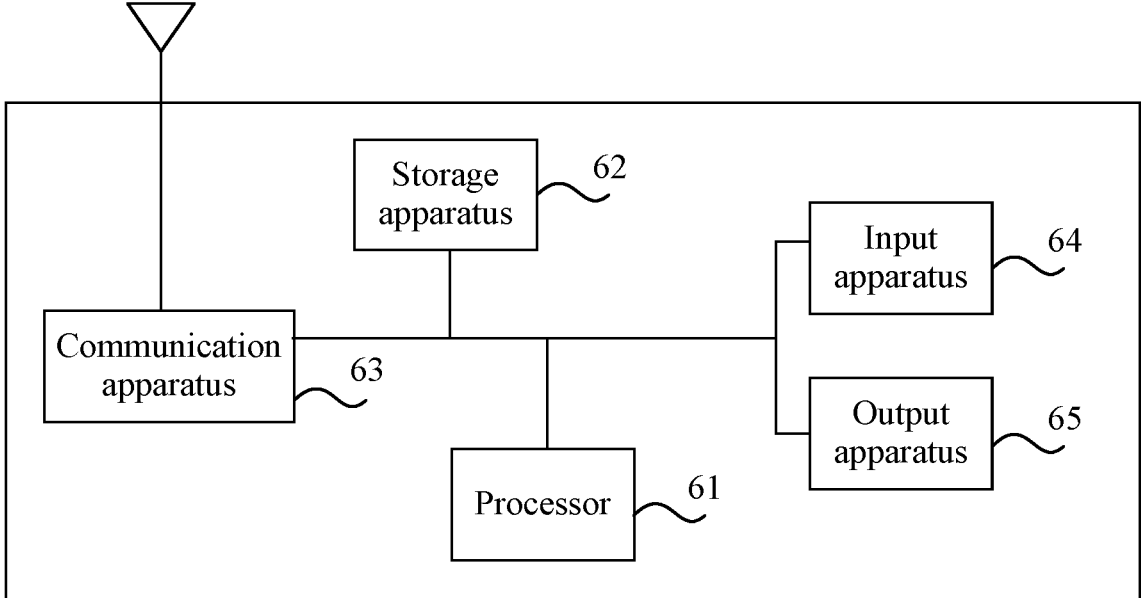
FIG. 11 is a diagram illustrating the structure of hardware of a central processing unit according to an embodiment.

The embodiments of the present application also provide a CPU. The CPU is a centralized control unit on a network side, for example, a main base station, a CPU, or a network management device. FIG. 11 is a diagram illustrating the structure of hardware of a central processing unit according to an embodiment. As shown in FIG. 11, a CPU provided in the present application includes one or more processors 61. The one or more processors 61, when executed, implement the signal transmission method applied by a CPU provided in any embodiment of the present application.

The CPU may also include a storage apparatus 62. One or more processors 61 may be provided in the CPU, and one processor 61 is used as an example in FIG. 11. The storage apparatus 62 is configured to store one or more programs. When executed by the one or more processors 61, the one or more programs cause the one or more processors 61 to implement the signal transmission method applied by the CPU as described in the embodiments of the present application.

The CPU also includes a communication apparatus 63, an input apparatus 64, and an output apparatus 65.

The processor 61, the storage apparatus 62, the communication apparatus 63, the input apparatus 64, and the output apparatus 65 in the CPU may be connected through a bus or in other manners. In FIG. 11, the connection through the bus is used as an example.

The input apparatus 64 may be configured to receive inputted digital or character information and generate key signal input related to user settings and function control of the CPU. The output apparatus 65 may include display devices such as a display screen.

The communication apparatus 63 may include a receiver and a sender. The communication apparatus 63 is configured to perform information transceiving communication under the control of the processor 61.

As a computer-readable storage medium, the storage apparatus 62 may be configured to store software programs, computer-executable programs and modules, such as program instructions/modules (for example, the reception module 21 and the demodulation signal determination module 22 that are in the signal transmission apparatus; in another example, the second cascade transmission module 41 in the signal transmission apparatus) corresponding to the signal transmission method applied by the CPU as described in the embodiments of the present application. The storage apparatus 62 may include a program storage area and a data storage area. The program storage area may store an operating system and an application program required by at least one function. The data storage area may store data created depending on use of the CPU. Additionally, the storage apparatus 62 may include a high-speed random-access memory and may also include a nonvolatile memory, such as at least one magnetic click memory, a flash memory, or another nonvolatile solid-state memory. In some examples, the storage apparatus 62 may include memories which are remotely disposed relative to the processor 61. These remote memories may be connected to the CPU via a network. Examples of the preceding network include, but are not limited to, the Internet, an intranet, a local area network, a mobile communication network, and a combination thereof.

Figure 12:
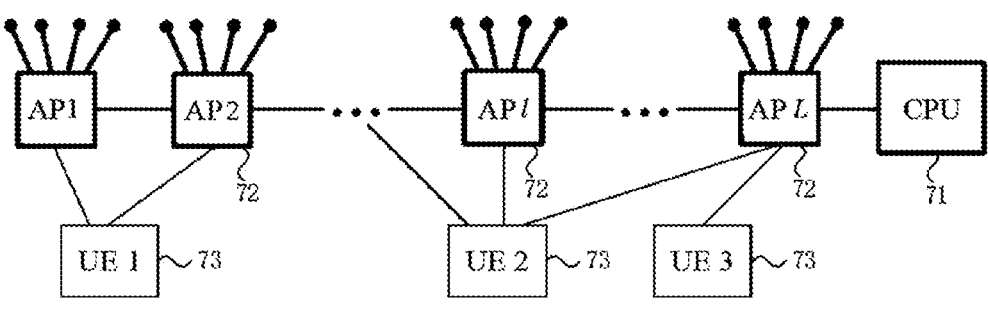
FIG. 12 is a diagram of a signal transmission system according to an embodiment.

The embodiments of the present application also provide a signal transmission system. FIG. 12 is a diagram of a signal transmission system according to an embodiment. As shown in FIG. 12, the system includes a central processing unit 71, at least one access point 72 according to any embodiment described above, and at least two terminals 73. Signals are transmitted between the central processing unit 71 and each terminal through at least one access point 72.

According to the signal transmission system in this embodiment, in the case where multiple terminals send uplink data signals to a CPU through an AP of at least one stage, an AP of each stage in the front-haul link processes the received data signal of each user to reduce the load of the front-haul link. The multi-user uplink data signal and the first inter-user interference information matrix are transmitted to provide more information for the signal processing of the CPU and improve the signal-to-noise ratio of received signals of the CPU. By receiving the multi-user uplink data signal and the first inter-user interference information matrix which are recovered by the last-stage AP in the front-haul link, the CPU determines a signal for demodulation. Thus, the demodulation performance is improved, and the demodulated signal has higher signal-to-noise ratio.

In the case where the CPU sends downlink data signals to multiple terminals through a front-haul link of an AP of at least one stage, an AP of each stage determines a transmit signal according to the acquired multi-user downlink data signal and second inter-user interference information matrix, thereby improving the signal-to-noise ratio of a signal received by a terminal. The CPU sends a multi-user downlink data signal to an AP of each stage for the AP of each stage to determine a transmit signal, thereby improving the signal-to-noise ratio of the signal received by a terminal.

In an embodiment, according to the channel estimation of a current AP, an AP of each stage determines a multi-user uplink data signal and a first inter-user interference information matrix which correspond to the current AP. The AP of each stage transmits the multi-user uplink data signal and the first inter-user interference information matrix to the next-stage node of the current AP in a front-haul link.

In an embodiment, an AP of each stage in the front-haul link is provided with at least one antenna. The number of row vectors of the first inter-user interference information matrix and the number of column vectors of the first inter-user interference information matrix are equal, and both are equal to the number of users. The number of row vectors of the multi-user uplink data signal is equal to the number of users. The number of column vectors of the multi-user uplink data signal is equal to the number of data symbols of received signals on a single antenna of the current AP.

In an embodiment, an AP of each stage determines the channel estimation according to the pilot portion of a received signal. Alternatively, an AP of each stage determines the channel estimation according to the pilot portion of a received signal and correlation matrix prior information of a multi-user channel. Alternatively, an AP of each stage determines the channel estimation according to the pilot portion of a received signal and energy prior information of a multi-user channel.

In an embodiment, according to the channel estimation of a current AP, determining a multi-user uplink data signal which corresponds to the current AP includes, in the case where the current AP is a first-stage AP, obtaining the multi-user uplink data signal corresponding to the current AP according to a conjugate matrix of the channel estimation of the current AP; and in the case where the current AP is not a first-stage AP, obtaining a current multi-user uplink data signal according to the conjugate matrix of the channel estimation of the current AP, and superimposing the current multi-user uplink data signal with a multi-user uplink data signal output from the upper-stage AP of the current AP to obtain the multi-user uplink data signal corresponding to the current AP.

In an embodiment, according to the channel estimation of a current AP, determining the first inter-user interference information matrix includes, in the case where the current AP is a first-stage AP, obtaining the first inter-user interference information matrix corresponding to the current AP according to the channel estimation of the current AP; and in the case where the current AP is not a first-stage AP, obtaining a current first inter-user interference information matrix according to the channel estimation of the current AP, and superimposing the current first inter-user interference information matrix with a first inter-user interference information matrix output from the upper-stage AP of the current AP to obtain the first inter-user interference information matrix corresponding to the current AP.

In an embodiment, the first inter-user interference information matrix includes one of the following: a correlation matrix of a multi-user channel; the sum of a correlation matrix of a multi-user channel and a noise diagonal matrix; or the inverse matrix of the sum of a correlation matrix of a multi-user channel and a noise diagonal matrix.

In an embodiment, the CPU receives a multi-user uplink data signal and a first inter-user interference information matrix which are transmitted by the last-stage AP in a front-haul link and determines a signal for demodulation according to the multi-user uplink data signal and the first inter-user interference information matrix.

In an embodiment, the signal for demodulation includes the product of a first matrix and a multi-user uplink data signal. The first matrix is the inverse matrix of the sum of a first inter-user interference information matrix and a noise diagonal matrix. Alternatively, the signal for demodulation includes the product of a second matrix and a multi-user uplink data signal. The second matrix is the inverse matrix of a first inter-user interference information matrix.

In an embodiment, an AP of each stage acquires related information of a multi-user downlink data signal and a second inter-user interference information matrix and determines a transmit signal of a current AP according to the related information of the multi-user downlink data signal and the second inter-user interference information matrix and the channel estimation of the current AP.

In an embodiment, the related information includes a multi-user downlink data signal and a second inter-user interference information matrix. Alternatively, the related information includes the product signal of a multi-user downlink data signal and a second inter-user interference information matrix.

In an embodiment, a second inter-user interference information matrix includes the inverse matrix of the sum of a correlation matrix of a multi-user channel and a noise diagonal matrix.

In an embodiment, the multi-user downlink data signal is sent by the CPU. A second inter-user interference information matrix is determined by the last-stage AP in the front-haul link or sent by the CPU. The product signal is sent by the CPU.

In an embodiment, the multi-user downlink data signal includes a multi-user data signal matrix or a multi-user bit data matrix.

In an embodiment, in the case where the current AP is the last-stage AP in the front-haul link, a second inter-user interference information matrix is sent to each non-last-stage AP in the front-haul link.

In an embodiment, a transmit signal includes the product of the channel estimation of a current AP, a second inter-user interference information matrix, and a multi-user downlink data signal, or the product of the channel estimation of a current AP and a product signal.

In an embodiment, the CPU sends a multi-user downlink data signal or the product signal of a multi-user downlink data signal and a second inter-user interference information matrix to an AP of each stage in a front-haul link.

In an embodiment, in the case of sending the multi-user downlink data signal to the AP of each stage in the front-haul link, the CPU sends a second inter-user interference information matrix to the AP of each stage in the front-haul link.

The embodiments of the present application also provide a storage medium. The storage medium stores a computer program which, when executed by a processor, implements the signal transmission method described in any embodiment of the present application.

The signal transmission method includes, according to the channel estimation of a current AP, determining a multi-user uplink data signal and a first inter-user interference information matrix which correspond to the current AP; and transmitting the multi-user uplink data signal and the first inter-user interference information matrix to the next-stage node of the current AP in a front-haul link.

Alternatively, the signal transmission method includes receiving a multi-user uplink data signal and a first inter-user interference information matrix which are transmitted by the last-stage AP in a front-haul link and determining a signal for demodulation according to the multi-user uplink data signal and the first inter-user interference information matrix.

Alternatively, the signal transmission method includes acquiring related information of a multi-user downlink data signal and a second inter-user interference information matrix and determining a transmit signal of a current AP according to the related information of the multi-user downlink data signal and the second inter-user interference information matrix and the channel estimation of the current AP.

Alternatively, the signal transmission method includes sending a multi-user downlink data signal or a product signal of a multi-user downlink data signal and a second inter-user interference information matrix to an AP of each stage in a front-haul link.

The process in which multiple terminals send uplink data signals to a CPU through an AP of at least one stage and the process in which the CPU sends downlink data signals to multiple terminals through an AP of the at least one stage may be performed at the same time. For example, the CPU receives and demodulates a multi-user uplink data signal and a first inter-user interference information matrix which are transmitted by the last-stage AP, and sends a multi-user downlink data signal to an AP of each stage at the same time.

A computer storage medium in the embodiments of the present application may use any combination of one or more computer-readable media. A computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus, or device, or any combination thereof. Examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable CD-ROM, an optical storage element, a magnetic storage device, or any suitable combination thereof. The computer-readable storage medium may be any tangible medium containing or storing a program. The program may be used by or used in conjunction with an instruction execution system, apparatus, or element.

The computer-readable signal medium may include a data signal propagated in a baseband or as part of a carrier. The data signal carries computer-readable program codes. The data signal propagated in this manner may be in multiple forms and includes, and is not limited to, an electromagnetic signal, an optical signal, or any suitable combination thereof. The computer-readable signal medium may also be any computer-readable medium other than a computer-readable storage medium. The computer-readable medium may send, propagate, or transmit the program used by or used in conjunction with the instruction execution system, apparatus, or element.

The program codes contained on the computer-readable medium may be transmitted on any suitable medium including, but not limited to, a wireless medium, a wire, an optical cable, or a radio frequency (RF), or transmitted on any suitable combination thereof.

Computer program codes for executing operations of the present application may be written in one or more programming languages or a combination of multiple programming languages. The programming languages include object-oriented programming languages such as Java, Smalltalk, and C++ and conventional procedural programming languages such as C language or similar programming languages. The program codes may be executed entirely on a user computer, partly on the user computer, as a stand-alone software package, partly on the user computer and partly on a remote computer, or entirely on the remote computer or a server. In a case related to the remote computer, the remote computer may be connected to the user computer via any type of network including a local area network (LAN) or a wide area network (WAN) or may be connected to an external computer (for example, via the Internet through an Internet service provider).

The preceding are only example embodiments of the present application

It is to be understood by those skilled in the art that the term "user terminal" covers any suitable type of radio UE, for example, a mobile phone, a portable data processing apparatus, a portable web browser, or a vehicle-mounted mobile station.

In general, multiple embodiments of the present application may be implemented in hardware, dedicated circuits, software, logics or any combination thereof. For example, some aspects may be implemented in hardware, and other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcode, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in the memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). The computer-readable medium may include a non-transitory storage medium. The data processor may be of any type suitable to the local technical environment for example, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A signal transmission method, comprising:
determining a multi-user uplink data signal corresponding to a current AP and a first inter-user interference information matrix corresponding to the current AP according to a channel estimation of the current access point (AP); and
transmitting the multi-user uplink data signal and the first inter-user interference information matrix to a next-stage node of the current AP in a front-haul link,
wherein determining the multi-user uplink data signal corresponding to the current AP according to the channel estimation of the current AP comprises:
in a case where the current AP is a first-stage AP, obtaining the multi-user uplink data signal corresponding to the current AP according to a conjugate matrix of the channel estimation of the current AP; and
in a case where the current AP is not a first-stage AP, obtaining a current multi-user uplink data signal according to the conjugate matrix of the channel estimation of the current AP, and superimposing the current multi-user uplink data signal with a multi-user uplink data signal output from an upper-stage AP of the current AP to obtain the multi-user uplink data signal corresponding to the current AP.

2. The method according to claim 1, wherein an AP of each stage in the front-haul link is provided with at least one antenna;
a number of row vectors of the first inter-user interference information matrix and a number of column vectors of the first inter-user interference information matrix are equal, and both are equal to a number of users; and
a number of row vectors of the multi-user uplink data signal is equal to the number of users, and a number of column vectors of the multi-user uplink data signal is equal to a number of data symbols of a received signal on a single antenna of the current AP.

3. The method according to claim 1, further comprising:
determining the channel estimation according to a pilot portion of a received signal; or,
determining the channel estimation according to a pilot portion of a received signal and correlation matrix prior information of a multi-user channel; or,
determining the channel estimation according to a pilot portion of a received signal and energy prior information of a multi-user channel.

4. The method according to claim 1, wherein determining the first inter-user interference information matrix corresponding to the current AP according to the channel estimation of the current AP comprises:
in a case where the current AP is a first-stage AP, obtaining the first inter-user interference information matrix corresponding to the current AP according to the channel estimation of the current AP; and
in a case where the current AP is not a first-stage AP, obtaining a current first inter-user interference information matrix according to the channel estimation of the current AP, and superimposing the current first inter-user interference information matrix with a first inter-user interference information matrix output from an upper-stage AP of the current AP to obtain the first inter-user interference information matrix corresponding to the current AP.

5. The method according to claim 1, wherein the first inter-user interference information matrix comprises one of the following:
a correlation matrix of a multi-user channel;
a sum of a correlation matrix of a multi-user channel and a noise diagonal matrix; or
an inverse matrix of a sum of a correlation matrix of a multi-user channel and a noise diagonal matrix.

6. The method according to claim 1, comprising:
acquiring related information of a multi-user downlink data signal and a second inter-user interference information matrix; and
determining a transmit signal of the current AP according to the related information of the multi-user downlink data signal and the second inter-user interference information matrix and a channel estimation of the current AP.

7. The method according to claim 6, wherein the related information comprises the multi-user downlink data signal and the second inter-user interference information matrix; or, the related information comprises a product signal of the multi-user downlink data signal and the second inter-user interference information matrix.

8. The method according to claim 7, wherein
the multi-user downlink data signal is sent by a central processing unit (CPU); and the second inter-user interference information matrix is determined by a last-stage AP in a front-haul link or sent by the CPU; and
the product signal is sent by the CPU.

9. The method according to claim 7, wherein the transmit signal comprises:
a product of the channel estimation of the current AP, the second inter-user interference information matrix, and the multi-user downlink data signal; or,
a product of the channel estimation of the current AP and the product signal.

10. The method according to claim 6, wherein the second inter-user interference information matrix comprises:
an inverse matrix of a sum of a correlation matrix of a multi-user channel and a noise diagonal matrix.

11. The method according to claim 6, wherein the multi-user downlink data signal comprises:
a multi-user data signal matrix or a multi-user bit data matrix.

12. The method according to claim 6, further comprising:
in a case where the current AP is a last-stage AP in a front-haul link, sending the second inter-user interference information matrix to each non-last-stage AP in the front-haul link.

13. An access point (AP), comprising:
at least one processor; and
a storage apparatus configured to store at least one program,
wherein when executed by the at least one processor, the at least one program causes the at least one processor to implement the signal transmission method according to claim 1.

14. A non-transitory computer-readable storage medium storing a computer program which, when executed by a processor, implements the signal transmission method according to claim 1.

15. A signal transmission method, comprising:
receiving a multi-user uplink data signal and a first inter-user interference information matrix which are transmitted by a last-stage access point (AP) in a front-haul link; and determining a signal for demodulation according to the multi-user uplink data signal and the first inter-user interference information matrix, wherein the signal for demodulation comprises:

a product of a first matrix and the multi-user uplink data signal, wherein the first matrix is an inverse matrix of a sum of the first inter-user interference information matrix and a noise diagonal matrix; or, a product of a second matrix and the multi-user uplink data signal, wherein the second matrix is an inverse matrix of the first inter-user interference information matrix.

16. The method according to claim 15, comprising:

sending a multi-user downlink data signal or a product signal of a multi-user downlink data signal and a second inter-user interference information matrix to an AP of each stage in a front-haul link.

17. The method according to claim 16, wherein in the case of sending the multi-user downlink data signal to the AP of each stage in the front-haul link, the method further comprising:

sending the second inter-user interference information matrix to the AP of each stage in the front-haul link.

18. A central processing unit (CPU), comprising:

at least one processor; and a storage apparatus configured to store at least one program, wherein when executed by the at least one processor, the at least one program causes the at least one processor to implement the signal transmission method according to claim 15.

* * * * *